United States Patent Office 3,646,126
Patented Feb. 29, 1972

3,646,126
METHOD FOR THE PRODUCTION OF
SUBSTITUTED GLUTARIC ACIDS
Hermann Richtzenhain, Schwellenbach, and Helmut aus der Funten, Mondorf, Germany, assignors to Dynamit Nobel AG, Troisdorf, Germany
No Drawing. Filed Aug. 28, 1969, Ser. No. 853,921
Claims priority, application Germany, Sept. 4, 1968,
P 17 93 350.5
Int. Cl. C07c 55/12, 55/02
U.S. Cl. 260—530 R                     5 Claims

ABSTRACT OF THE DISCLOSURE

Method for the production of glutaric acids of the general Formula I

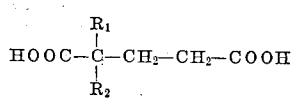

in which $R_1$ and $R_2$ signify alkyl groups with 1–4 C-atoms, or in which $R_1$ and $R_2$ together with the carbon atom to which they are attached can form a carbocyclic ring, by oxidation and saponification of cyano aldehydes of the general Formula II

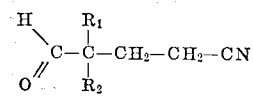

in which $R_1$ and $R_2$ have the meaning indicated above which oxidation is carried out with chlorine and/or bromine in the presence of at least a stoichiometrical amount of water.

---

It is known that glutaric acids of the above mentioned formula can be produced from cyano aldehydes of the above mentioned formula by oxidation and saponification. Thus, the production of dimethyl glutaric acid from 2,2-dimethyl-4-cyano butyraldehyde by oxidation with a mixture of nitric acid and sulfuric acid has been described by different authors. Franke and Bueren, Z. Naturforschung 5 b (1950) p. 122, obtained a yield of 75%, while C. K. Warren and B. C. L. Weeden, J. Chem. Soc. 1958, pp. 3972–86, in accordance with the same method could only obtain a yield of 47%. The oxidation with bi-chromate sulfuric acid, R. F. Brown and G. H. Schmidt, J. Org. Chem. 27 (1962) p. 1288–94, produces only small yields. Also the alkaline saponification of the nitrile group and oxidation with potassium permanganate did not result in satisfactory yields of substituted glutaric acids. Although the oxidation with nitric acid, has produced the best yields (75%) to date, this process is not particularly satisfactory commercially. It is strongly exothermic and is—especially in commercial operations—difficult to control even with very careful dosage. Moreover, a considerable excess of nitric acid is required, because on the one hand a part of the nitric acid escapes in the form of nitrogen oxides, and on the other hand the solution after the oxidation has been completed still contains considerable amounts of nitric acid, which because of their low concentration are no longer usable as an oxidating agent. For reason of economy, the escaping nitrogen oxides and the remaining nitric acid should be reconverted into nitric acid of suitable concentration, whereby additional procedural steps are required. Furthermore, the major portion of the ammonia resulting from the saponification of the nitrile group is lost because it is oxidized to nitrogen while using up nitric acid.

Surprisingly it was now found that cyano aldehydes of the above general formula may be converted to substituted glutaric acids with excellent yields when the oxidation of the aldehyde group is carried out in a technically simple manner with a halogen such as chlorine and/or bromine in the presence of water, whereby the saponification of the nitrile group can be effected before, during, or after this oxidation of the aldehyde group.

Therefore, it is not necessary to use oxygen-containing oxidating agents. The chlorine or bromine oxidating agents are used only in a stoichiometric amount or in slight excess of up to about 5%. The oxidation proceeds rapidly and may be monitored by the determination of the halogen consumption. Practically, the reaction velocity is limited only by the halogen introduction velocity, or the solubility of the chlorine, or by the addition velocity of the bromine. Advantageously, the reaction velocity of chlorine may therefore be increased by the use of increased pressure. Excess of chlorine or bromine can be removed in a simple manner, by passing air or an inert gas through the reaction medium.

As starting materials for the method in accordance with the invention there may be used for instance 2,2-dimethyl-, 2,2-diethyl-, 2-ethyl-2-isopropyl-, 2-ethyl-2-n-butyl-, 2,2-tetramethylene-, 2,2-pentamethylene-4-cyanobutyr aldehyde or the like. Cyano aldehydes are conventionally easily made by the β-cyanoethylation of aldehydes. The method of this invention is, however, not limited to aldehydes so produced. The reaction in accordance with the invention proceeds in accordance with the following summary equation:

$$\text{II} \quad OC\underset{R_2}{\overset{\underset{|}{R_1}}{\underset{|}{\overset{H}{-}}C}}-(CH_2)_2-CN + Cl_2 + 3H_2O = HOOC\underset{R_2}{\overset{\underset{|}{R_1}}{-}C}-(CH_2)_2-COOH + HCl + NH_4Cl$$

The total reaction can be carried out in accordance with (II) in one step. The reaction may be separated, depending on whether at first the cyano aldehyde is to be only oxidized to the nitrile carboxylic acid (IIa), whereupon the latter is then saponified acidically to the dicarboxylic acid (IIb).

IIa
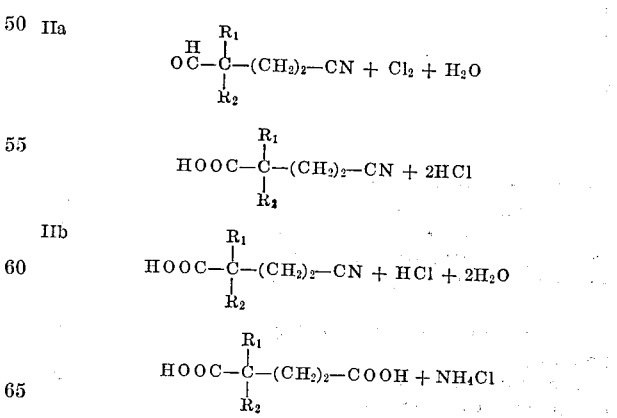

or whether the cyano aldehyde is first to be saponified acidically to the aldehyde carboxylic acids (IIIa) and the latter is then oxidized with chlorine to the dicarboxylic acid (IIIb)

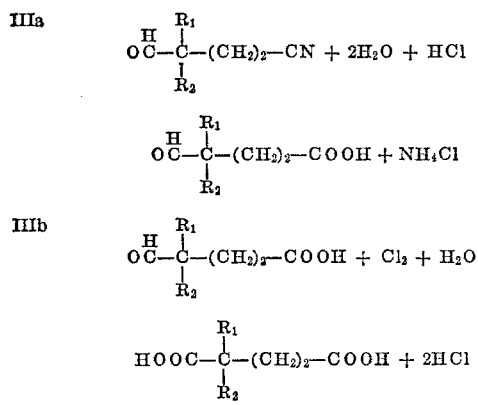

The oxidation of the aldehyde group with chlorine in the presence of water in accordance with Equations IIa or IIIb takes place practically completely even at the low temperature, below 40° C. If in accordance with Equation IIa the nitrile carboxylic acid should be intended as an intermediate state, the oxidation with chlorine must be carried out at temperatures below 40° C., preferably between 5° and 30° C., because of the danger of nitrile saponification. The temperature is not critical for the oxidation of the aldehyde acid in accordance with reaction IIb. It is possible to operate at temperatures between about 5° and 120° C.

In the saponification of the nitrile groups in accordance with reaction IIb or IIIa, it is not critical to strictly control the temperature. In order to reach a sufficient saponification velocity, temperatures between about 50 and 120° C. can be used. It is preferable to work within a temperature range of 70° to 105° C. With simultaneous oxidation and saponification, temperatures between 50 and 120° C., preferably between 70 and 105° C. have been found to be satisfactory.

The ratio of water to cyano aldehyde is not critical to the oxidation itself. Stoichiometry requires amounts of at least about 3 mols of water/mol of cyano aldehyde. As a rule, at least as much water is used as is necessary for the dissolution of the formed ammonium chloride. Therefore there is preferably used about 1 to 3 times as much water as required by the cyano aldehyde stoichiometry.

The reaction may be carried out in the presence of inert solvents or not as desired. Where used, these solvents may be chlorinated hydrocarbons, in which case only the stoichiometrically required amount of water needs to be present. The oxidation is carried out in such a manner that the cyano aldehyde is dispersed in water or in the aqueous solvent, and at least the stoichiometrically required amount of halogen, e.g. chlorine is introduced thereinto. As a rule, a small excess of chlorine is necessary. A larger excess may result in the formation of chlorinated products and therefore should be avoided.

The formed glutaric acids separate in part from the acid solution and may be separated directly therefrom. For complete recovery, the acid solution is extracted with suitable solvents, such as chlorinated hydrocarbons, exemplified by methylene chloride, chloroform, carbon tetrachloride, 1,2-dichloro ethane, methyl chloroform, etc., or non-chlorinated hydrocarbons, such as benzene, toluene, etc.

The reaction may be advantageously carried out continuously.

The ammonia formed by the saponification of the nitrile groups is present in the form of ammonium chloride, which can be utilized as such, or may be converted into ammonia. In the prior art process, of oxidizing with nitric acid, the predominant portion of the formed ammonia is lost in form of nitrogen.

In the following examples, the concentrations are given in weight percent, the reactions and yields are indicated in mol percent.

EXAMPLE 1

Into a mixture of 125 g. (1 mol) 2,2-dimethyl-4-cyano butyr-aldehyde with 1.25 g. water, finely emulsified by stirring, chlorine is introduced for such a length of time and at such a speed that no chlorine is recognizable above the emulsion. The reaction temperature increases within one hour from 19 to 48° C., and then to 54° C. after another hour. It is then kept for 2¾ hours at 60-80° C. by occasional heating. After 3 hours of reaction, the emulsion became a solution. Crystals form which dissolved by the addition of 50 ml. of water. The solution is extracted while still warm with 1,2 dichloro ethane. The water contained in the extract is azeotropically distilled off, whereupon after filtering off small portions of precipitated ammonium chloride, the extract is concentrated. The remaining residue is re-crystallized and dried from ether/petroleum ether (1:1). Yield 145.8 g. (90.7% of the theory), melting point 77-80° C. The melting point of a mixture of the product with 2,2-dimethyl glutaric acid showed no depression. When using the equivalent amount of bromine instead of chlorine, a corresponding result is obtained.

EXAMPLE 2

100 g. chlorine water, saturated with chlorine at 40° (0.485% Cl$_2$) are reacted in a closed Erlenmeyer flask with the stoichiometrical amount (0.981 g.) of 4,4-dimethyl glutaric aldehyde acid. The temperature during the reaction is kept constant at 40° C. The consumption of chlorine is checked by iodometric titration. From this, the conversion is calculated, after 0.5 hour, 78.4%, after one hour 87.4% and after 4 hours 88.85%. After 20 hours, the conversion finally amounts to 93.7%. The aqueous solution is extracted with 1,2-dichloro ethane for 6 hours. After removal of the extraction agent, the 2,2-dimethyl glutaric acid remains as a crystallized residue having a melting point of 80-81° C. The yield corresponds to the chlorine converted.

EXAMPLE 3

Chlorine is introduced into an emulsion of 187.5 g. 2,2-dimethyl-4-cyanobutyr aldehyde and 300 g. water at a velocity of flow of 7 to 8 l./h. The temperature is kept at 18° C. through cooling. Under these conditions, the entire amount of chlorine is introduced into the liquid phase. After 5¾ hours, the weight of the reaction mixture increased to 112.5 g. The chlorine flow was stopped, the reaction mixture slowly heated to 40° C. and kept at this temperature for 1½ hours. The organic phase completely separates with a slight yellow coloration. The organic phase is now heated to 70-80° C. to induce saponification. The solution, which is still hot, is agitated with 1,2-dichloroethane, while precipitated NH$_4$Cl is brought into solution by the addition of water. After concentrating the organic phase, 2,2-dimethyl glutaric acid crystallizes off, Yield: 129 g., melting point 79-80.5° C. By extraction of the aqueous phase of the saponification solution with 1,2-dichloroethane and concentrating of the mother-liquor of the crystallization, additional 63.7 g. of 2,2-dimethyl-glutaric acid were obtained, so that the entire yield thus amounted to 192.7 g. (80.37% of the theory). As by-product 14.62 g. (6.92% of the theory) 2,2-dimethyl glutaric imide were isolated which is also converted into the equivalent amount of 2,2-dimethyl glutaric acid by hydrolysis.

EXAMPLE 4

If Example 3 is repeated, using 271.5 g. 2-ethyl-2-butyl-2-cyanobutyr aldehyde instead of 2,2-dimethyl-4-cyano-butyr aldehyde two layers separate after saponification. After separating the organic layer, the aqueous layer is extracted with 1,2-dichloroethane, the extract is united with the organic layer, and the extractant is finally removed at reduced pressure. A sample amount is brought to crystallization by the addition of nitro methane. Melting point of the 2-ethyl-2-butyl glutaric acid: 78–80° C.

When using (a) 2-ethyl-2-isopropyl-4-cyanobutyr-aldehyde or (b) 2,2-pentamethylene-4-cyanobutyr-aldehyde, there are obtained (a) 2-ethyl-2-isopropyl glutaric acid or (b) 2,2-pentamethylene glutaric acid.

EXAMPLE 5

Into a stirred emulsion of 1250 g. 2,2-dimethyl-4-cyanobutyr-aldehyde in 2700 g. water, 710 g. chlorine were introduced by maintaining a temperature of 18–20° C. After completed introduction of the chlorine, the mixture was heated for 5½ hours to 90° C. The mixture solidified during cooling into crystals. By extraction with 1,2-dichloroethane, 1347 g. (84.2% of the theory) of 2,2-dimethylglutaric acid were obtained with a melting point of 80.5–81.5° C. From the dichloroethane mother-lye, a further amount of 2,2-dimethyl gutaric acid (7.3% of the theory) can be isolated, so that an entire yield of 91.5% of the theory results.

EXAMPLE 6

187 g. 2,2-dimethyl-4-cyanobutyr aldehyde is saponified with diluted hydrochloric acid at 85° C. to 4,4-dimethyl glutaric aldehyde acid, whereupon chlorine is introduced into the solution which has been cooled down to 40° C., and the resulting 2,2-dimethyl glutaric acid is worked up. Yield: 89% of the theory.

What is claimed is:

1. Process for the production of a glutaric acid of the general formula:

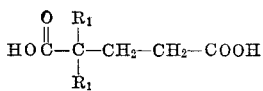

comprising simultaneously oxidizing and saponifying a cyano-aldehyde of the formula:

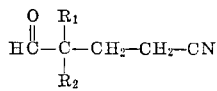

wherein $R_1$ and $R_2$ are each a lower alkyl group of about 1 to 4 carbon atoms or, together with the carbon atom to which they are attached, a carbocyclic ring of up to about 7 carbon atoms, which oxidation and saponification is carried out at about −5 to 120° C. by contacting said cyano-aldehyde with at least one halogen selected from the group consisting of chlorine and bromine and with at least the stoichiometric quantity of water related to said cyano aldehyde.

2. Process claimed in claim 1 wherein said oxidation and saponification are carried out at about 50 to 120° C.

3. Process claimed in claim 2 carried out at about 70 to 105° C.

4. Process claimed in claim 1 carried out in the presence of at least one substantially inert solvent.

5. Process claimed in claim 4 wherein said solvent is at least one member of the group consisting of methylene chloride, chloroform, carbon tetra chloride, 1,2-dichloroethane, methyl chloroform, benzene and toluene.

References Cited

Cullis et al.: J. Chem. Soc. (1962), 3348–3350.
March: Advanced Org. Chem. McGraw-Hill (1968), p. 541.
Noller: Chem. of Org. Cmpds. Saunders (1965), p. 870.

LORRAINE A. WEINBERGER, Primary Examiner

R. D. KELLY, Assistant Examiner

U.S. Cl. X.R.

260—514 R